---

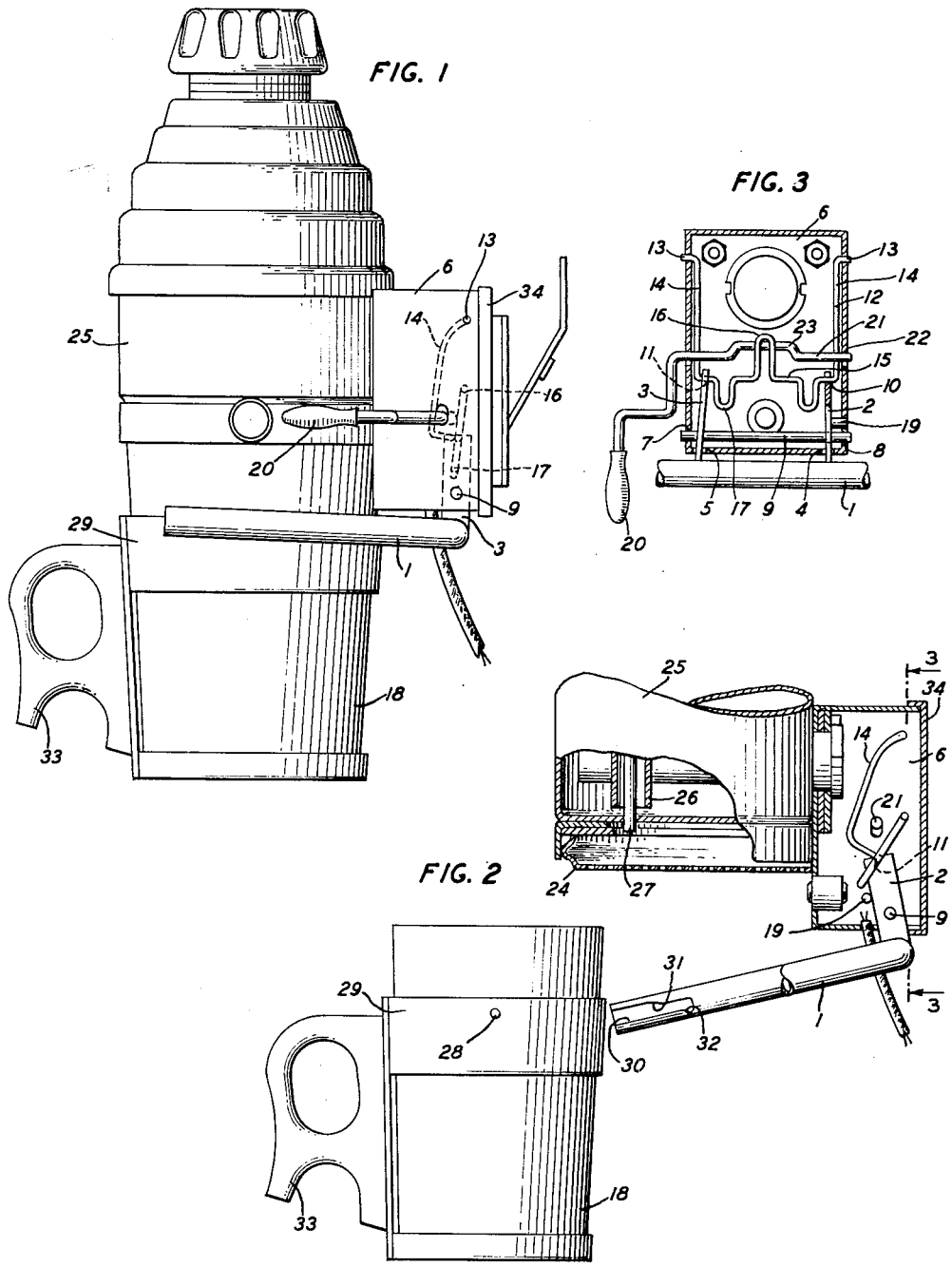

United States Patent Office 2,989,093
Patented June 20, 1961

---

2,989,093
SINGLE HAND CONTROL FOR HOT BEVERAGE PREPARATION APPARATUS FOR USE PARTICULARLY IN AIRCRAFT AND AUTOMOBILES
Theodor H. Stiebel, Luchtringer Weg 11,
Holzminden (Weser), Germany
Filed Nov. 21, 1958, Ser. No. 775,465
9 Claims. (Cl. 141—278)

This invention relates to holder means for supporting a cup or other beverage receptacle against a beverage delivery outlet of, for example, a hot beverage preparation device in automobiles, aircraft, and other moving vehicles.

An object of the invention is to permit the removal and replacement of the beverage receptacle with a one-hand operation so that, for example, the driver of an automobile or the pilot of an aircraft may do so and serve himself a freshly prepared hot beverage with minimum diversion of his attention from his main function of controlling the particular vehicle.

A further object of the invention is to provide a tiltable, fork-shaped holder for the beverage receptacle, such as a cup, which spring presses the cup against the hot beverage outlet of the hot beverage preparation apparatus while permitting facile removal and restoration of the cup into the holder with one hand.

For use in automobiles, the prior art includes coffee preparation devices affixed to a panel or dashboard in which, in the operative position, the cup is pressed against the filter below the water chamber. The cup is so pressed by means of a vertically movable, and laterally loosely guided, cup support operable from therebelow by a drive screw. When the cup, filled with prepared coffee, is to be removed, it is lowered by manually rotating the drive screw a few turns. Then the cup is grasped at its handle by the same hand and removed from a spring clamp about it or the loose, dovetailed guide support directly above the cup support. Such construction has the disadvantage that on actuation by one hand in lowering the cup, the latter, due to its support being but loosely guided, will inevitably and undesirably wobble. Furthermore, time is required both for lowering it and grasping it, and diverts the attention of the driver, desiring the beverage, from his primary task. For use in automobiles there is also known a coffee machine having a cup positioned below the filter mounted on the dashboard. When the boiling point is reached, a manually operable lever is actuated to permit passage of boiling water through the ground coffee beans. The cup, filled with the hot beverage, cannot immediately be removed from the machine but only after the whole machine is removed from the dash, thus breaking the electric current supply. It follows, operation thereof by one hand is not possible. Still another prior art machine is in the form of a tiltable coffee preparation device affixed to the dashboard and having a cup loosely over it. Its operation can be managed only with the use of both hands since one is required to tip the machine to pour the prepared coffee into the removed cup held in the other hand.

My instant invention provides a hot beverage preparation apparatus in which the hot beverage is electrically prepared just before the desired time of consumption and flows into a removable beverage container operatively positioned below the hot beverage outlet of the apparatus. The filled container is readily removed by one hand from a spring pressed yoke which is tiltable from its position in which the container in operative position is held against the hot beverage outlet of the apparatus. The empty receptacle is readily replaced by one hand into the yoke and with a simultaneous upward movement by the hand after inserting the receptacle the yoke and cup started upwardly and under the tension of a spring resiliently pressed against the outlet, against which it is latched by actuating with such hand the latching lever to its upward position.

The foregoing, and other, objects of my invention will more readily be understood from the following description with the accompanying drawing, in which:

FIGURE 1 is a perspective side view of an illustrative embodiment of the vehicle coffee machine with the beverage consumption vessel in its position closed against the machine;

FIGURE 2 is a fragmentary side elevational view of the illustrative embodiment of the vehicle coffee machine, partially broken away and in section, with the beverage consumption vessel and its holder in the removal position; and FIGURE 3 is a section on line 3—3 of FIGURE 2.

The yoke or holder 1 is fork-shaped and from its crest region has a pair of integral arms 2 and 3 extending upwardly therefrom and substantially perpendicular to the plane of the fork and through a pair of slits 4 and 5, registering with the arms, respectively, into the housing 6. Aligned openings 7 and 8, in opposite walls of the housing 6, support a shaft 9 just above the slits 4 and 5, the shaft 9 passing through the arms 2 and 3 and thus permitting the holder 1 to be tilted about the shaft 9. As shown in the drawing, the distance between shaft 9 and the crest of the holder 1 is relatively small as compared to the distance from the shaft 9 to the free ends of the arms 2 and 3. In the free ends of the arms 2 and 3, respectively, a notch or recess, 10 and 11, is provided in which a pretensioned spring 12 is inserted to guide the actuation thereof.

The pretensioned spring 12 is a springy metal wire in the general shape of a U with its upper, and outwardly extending, ends 13 fixed into the opposite side walls of the housing 6 at the upper end region thereof and in substantial alignment with the shaft openings 7 and 8. The arms 14 of the U-spring 12 are both themselves of C-shape with the bulge thereof to the left as shown in FIGURES 1 and 2. The cross-piece or base portion 15 of the spring 12 at its intermediate region has a plurality of integral projections 16 and 17, extending in diametrically opposite directions therefrom and substantially perpendicular to the lower end of the C-shaped spring arms 14. The end regions of the base portion 15 of the spring 12 are nested in the recesses 10 annd 11, as above stated. The spring ends 13 are so affixed in the side walls, and the tension of the C-shaped spring arms 14 is such that, when free to move as shown in FIGURE 2, the lower portion of the spring arms 14 and the spring base portion 15 will move to the left beyond the dead center, carrying arms 2 and 3 along with the spring base portion 15, and thus tilting the holder 1. To limit the amount of tilt of the holder 1 to just that required easily to remove the beverage container 18, without spilling its beverage contents, from the yoke, a stop 19 is provided in the path of at least one arm, for example 2, as shown.

A manually operable safety or latching lever 20 has its shaft 21 rotatably supported in openings 22 in the opposite side walls of the housing 6, the openings 22 being so positioned above the path of the free ends of arms 2 and 3 as to permit movement of the latter without hindrance by the shaft 21. The openings 22 are also so positioned, to the right as shown, of the C-spring arms 14 as to permit unobstructed movement to the right for the operative movement of such spring arms 14. The central portion 23 of the shaft 21 is displaced axially from the end regions of the shaft 21 in such manner that on rotation of the lever 20 clockwise from its depressed position to its horizontal position, its central shaft portion 23, engages the spring extension 16 to hold it beyond the dead center to the right thereof. Prior to operation of the safety lever to the last mentioned position, the yoke, with cup inserted and a slight upward movement imparted to it manually, is swung upwardly against the beverage preparation outlet by spring 12 because the arms 2 and 3 have, on the slight push imparted to it manually, moved the bottom portion 15 of the spring to the right of its dead center. In the horizontal position of the safety lever 20 then, the removable beverage container 18 is thus resiliently latched to the apparatus by the interaction of shaft portion 23 and spring projection 16; and hence all undesirable movements of the holder 1 are prevented when the vehicle, and hence the beverage preparation device, is subjected to shocks, jolts, etc.

The lower portion 24 of the apparatus 25 is preferably the ground coffee bean container, which itself is readily removable for removal and renewal of its contents. Of the beverage preparation apparatus, which may, for example, be of the type disclosed in Patent 2,835,782 for "Apparatus for Preparing Coffee Beverages," issued to me on May 20, 1958, the riser tube 26 and the hot water outlet passage 27, the latter opening into the perforated ground coffee container 24, are shown in FIGURE 2.

The removable beverage container 18, which preferably has a beverage capacity, even when assuming the maximum tilted position of its holder in its container removal position, as shown in FIGURE 2, in excess of the water capacity of the beverage preparation apparatus 25, is supportable in the holder by means of two pins 28 on its carrier 29. The pins 28 are adapted to engage the larger longitudinal grooves 30 in the facing inner surfaces of the arms of the holder 1, the grooves having a taper 31 inwardly and downwardly to a formed recess 32. The larger dimensioned end widths of the grooves 30 at the free ends of the holder arms, permit of the ready insertion of the pins 28 thereinto, whereupon on pushing the beverage container 18 further along in the grooves, the taper 31 forcibly guides the pins into the recesses 32, with the depression of the pins 28 into the recesses 32 further aided by the resilient holding of the holder arms against the preparation apparatus beverage outlet.

Thus, when the driver of the automobile, or the pilot of the aircraft, desires to remove the beverage filled container 18, he merely need with one hand move the horizontal safety lever 21 to its vertical downward position, thereby releasing the latching of shaft portion 23 and spring projection 16, and then with such hand grasp the handle 33 of the beverage filled container 18, inserting his middle and index fingers therethrough, and push slightly downward whereupon the holder will freely tilt, assisted by the tension of spring arms 14 moving from the right of the dead center of the spring to the left of such dead center, to its open position as he withdraws the beverage container. This he can do with a minimum distraction from his controlling supervision of the automobile or aircraft; in fact, absolutely no visual observation of the coffee preparation apparatus while so doing, or particular skill to do so, is required in and for the removal of the filled beverage container. For the return of the beverage container to the holder concededly some observation is required to determine quickly the relative position of the container and the holder into which it is to be inserted. Usually the container is placed in the holder before the start of the journey, at the same time as the apparatus is charged with the required water and solid brewing ingredients. Even though after consumption of the beverage there is no absolute need, excepting perhaps orderliness, to replace the container in the holder, its replacement during the journey is relatively simple. All that is required is that the middle and index fingers be inserted into the handle 33, the pins 28 registered with the grooves 30, and the container pushed into the holder 1, the pushing being assisted by the pressure of the thumb resting on the handle 33, and give the receiver a slight upward push, whereupon the spring restores the receptacle to the outlet, and then with the same hand bring the safety lever from its downward position to its horizontal position to latch the spring.

The rear wall 34 of the housing 6 is of such shape that it can readily be inserted in the instrument panel or board of the vehicle to hang the complete assembly therefrom and to make the necessary electrical connection from the electrical heating element of the beverage preparation apparatus to the available source of electric energy. The electrical connections, not here described but well known in the art, include a switch manually actuatable at the desired time to close the circuit and automatically disconnecting the heating element from the electric source when the preparation is completed. Examples thereof are disclosed, for example, in U.S. Patent 2,732,478, issued to me on January 24, 1956, for "Immersion Heaters."

What I claim is:

1. In combination with a hot beverage preparation apparatus for use particularly in automobiles and aircraft, the apparatus having a continuously open beverage outlet in its bottom and a beverage container fitted to the outlet, a fork supporting the container in registering relation with the outlet, the fork being pivotal relative to the outlet at the closed end region of the fork, a spring biasing the fork to engage the container with the outlet, means movable to a first position to engage the spring and prevent pivoting of the fork resiliently to maintain the container in sealing contact with the outlet and to a second position to release the spring to permit pivoting of the fork away from the outlet, and stop means limiting the pivoting motion of the fork to a predetermined amount in the direction away from the outlet.

2. A hot beverage preparation apparatus particularly for automobiles and aircraft comprising a beverage preparation device having an open outlet at its bottom, a beverage receiving and drinking vessel engageable with and removable from the outlet, a fork pivoted at its crest and supporting the vessel at its free forked end, a formed spring biasing the fork crest selectively in a first direction to position the fork arms substantially horizontal and coplanar with the outlet and in a second direction to position the fork arms at an inclination so that its free ends are below the outlet, a stop limiting the inclination of the fork to a predetermined angle to permit unobstructed withdrawal of the vessel from the fork, and a pivoted lever manually positionable selectively horizontally forward to latch the formed spring in its biasing condition in the first direction and vertically downward to convert the bias of the spring to its second direction of biasing and aided by the weight of the vessel pivot the fork against the stop.

3. The hot beverage preparation apparatus according to claim 2 in which the fork crest has a pair of spaced arms integral therewith against which the formed spring bears at its free end, the formed spring is U-shaped and supported at the ends of the U-shape and has an eccentric central portion, and the pivoted lever has an integral shaft with an eccentric portion which bears against the eccentric portion of the U-shaped spring when the pivoted lever is substantially horizontal.

4. The hot beverage preparation apparatus according to claim 3 in which the fork crest is pivoted to the rear of the beverage preparation device and the fork arms extend forwardly about the outlet of the beverage preparation device, the vessel has diametrically opposite externally projecting pins, and the inner faces of the free ends of the fork arms define a pair of grooves receiving the vessel pins, the grooves being of such a width that the vessel pins are slidable therein and each groove has a detent in its lower face at its end remote from the free fork end into which the vessel pin is depressed, the detents being so positioned that with the vessel pins therein respectively the vessel registers with the outlet of the preparation device.

5. A hot beverage preparation device, particularly for use in automobiles and aircraft, comprising a hot beverage electrical preparation apparatus, a prepared beverage outlet through its bottom, a beverage receptacle having an open upper end to fit tightly over the outlet in its beverage receiving position, a forked holder removably receiving the receptacle, the holder being positioned below the outlet and having at its end opposite the forked region thereof at least one arm integral therewith and extending perpendicularly upward therefrom, a casing, a shaft supported in the casing upon which the arm is rotatable, a U-shaped spring of which the open ends are supported in opposite walls of the casing and its lower end is supported in the free end of the arm, the legs of the U-shaped spring being pretensioned to deflect the arm from a substantially vertical position, a rotatable second shaft supported in the said opposite walls above the free end of the arm and out of the path of movement of the lower portions of the legs of the spring, the rotatable second shaft having a central portion eccentric with respect to its end portions for engaging the U-spring and move it against its pretension, and a hand lever on one end of the second rotatable shaft external to the casing and aligned with the middle of the eccentric central portion of the second shaft, the hand lever being so positioned thereon that when the lever is horizontal the eccentric second shaft portion latches the spring against its pretension to maintain the arm substantially vertical and the open end of the receptacle in the yoke resiliently against the outlet.

6. A hot beverage preparation device according to claim 5 in which the base of the U-shaped spring has at least one projection extending radially therefrom into the path of rotation of the eccentric central portion of the second rotatable shaft when the spring is in the position it freely occupies under its pretension.

7. A hot beverage preparation device according to claim 5 in which a stop positioned within the casing limits the movement of the arm about the shaft after movement of the arm has been initiated on deflection of the hand lever from the horizontal thereby removing the eccentric second shaft portion from its spring maintaining position to permit the pretension of the spring to move the arm about its shaft to disengage the lower region of the spring from a recess in the free end of the arm, and the arm continues its movement under the weight of the receptacle in the holder.

8. A hot beverage preparation device, particularly for use in automobiles and aircraft, comprising a hot beverage electrical preparation apparatus, a prepared beverage outlet through its bottom, a beverage receptacle having an open upper end of such configuration as to fit tightly over the outlet in its beverage receiving position, a casing supported on the device and extending below the outlet, a first shaft rotatably supported in opposite walls of the casing in the region thereof below and the more remote laterally from the outlet, a pair of arms rigidly on the first shaft and each having a minor portion thereof extending through the bottom of the casing, a forked holder having an open free end for receiving the receptacle in cooperative relation to the outlet and a closed end integrally attached to the end regions of the arms extending from the bottom of the casing, a U-shaped wire spring having a pair of arms connected at one end by a crosspiece, the free ends of the arms of the wire spring being fixedly supported in the opposite walls of the casing at the top region thereof the more remote from the device, the arms per se of the spring being in the form substantially of a C open to the casing interior region the more remote from the device and so pretensioned that the lower regions thereof inclusive of the cross-piece tend to occupy a position nearer to the device than the position of support of the free ends of the spring, the crosspiece of the spring having diametrically opposite integral radial projections, a second rotatable shaft supported in the opposite casing walls at a region bounded by the C-shaped spring arms at such portion therewithin as not to engage the spring arms at any time, the central portion of the second shaft being eccentric to its ends, a handle on at least one end portion of the second shaft extending through the casing and coplanar external to the casing with the high portion of the dwell of the eccentric second shaft portion within the casing, and a recess in the free end of each arm of the pair, the axial end portions of the spring cross-piece engaging the recesses when the spring is held against its pretension by the eccentric second shaft portion engaging the upper one, at the time, of the integral projections of the spring cross-piece when the handle is horizontal, disengaging from the recesses at an intermediate portion of arm movement as the lower portion of the spring moves the arms of the pair under the pre-tension of the spring on breaking the spring maintenance position between the eccentric second shaft portion and such projection by moving the handle manually from the horizontal, and reengaging such recesses at an intermediate portion of the return arm movement as the handle is deflected back to the horizontal thereby engaging the eccentric second shaft portion to one of the diametrically opposite integral projections of the spring crosspiece to carry the lower region of the spring inclusive of the cross-piece to the spring maintenance position.

9. The hot beverage preparation device according to claim 8 in which the beverage receptacle has diametrically opposite, externally projecting, pins adjacent its open top region, and the inner faces of the arms of the forked holder each define a longitudinal groove from the free end of the forked holder with a detent in the bottom surface of the groove at the end thereof remote from the free end of the forked holder arms, the receptacle pins slidingly fitting into the grooves and the detents being so positioned that with the receptacle pins therein the receptacle registers with the prepared beverage outlet when the handle is horizontal.

References Cited in the file of this patent

UNITED STATES PATENTS

| | | |
|---|---|---|
| 382,023 | Bauer | May 1, 1888 |
| 651,274 | Schneider | June 5, 1900 |
| 2,080,957 | Barnett | May 18, 1937 |
| 2,210,126 | Riesen et al. | Aug. 6, 1940 |
| 2,783,703 | Brown | Mar. 5, 1957 |
| 2,783,704 | Liebelt | Mar. 5, 1957 |

FOREIGN PATENTS

| | | |
|---|---|---|
| 464,687 | Great Britain | Apr. 21, 1937 |